June 3, 1930.  J. C. SCHELLIN  1,761,157
HOSE COUPLING ADAPTER
Filed Jan. 28, 1928
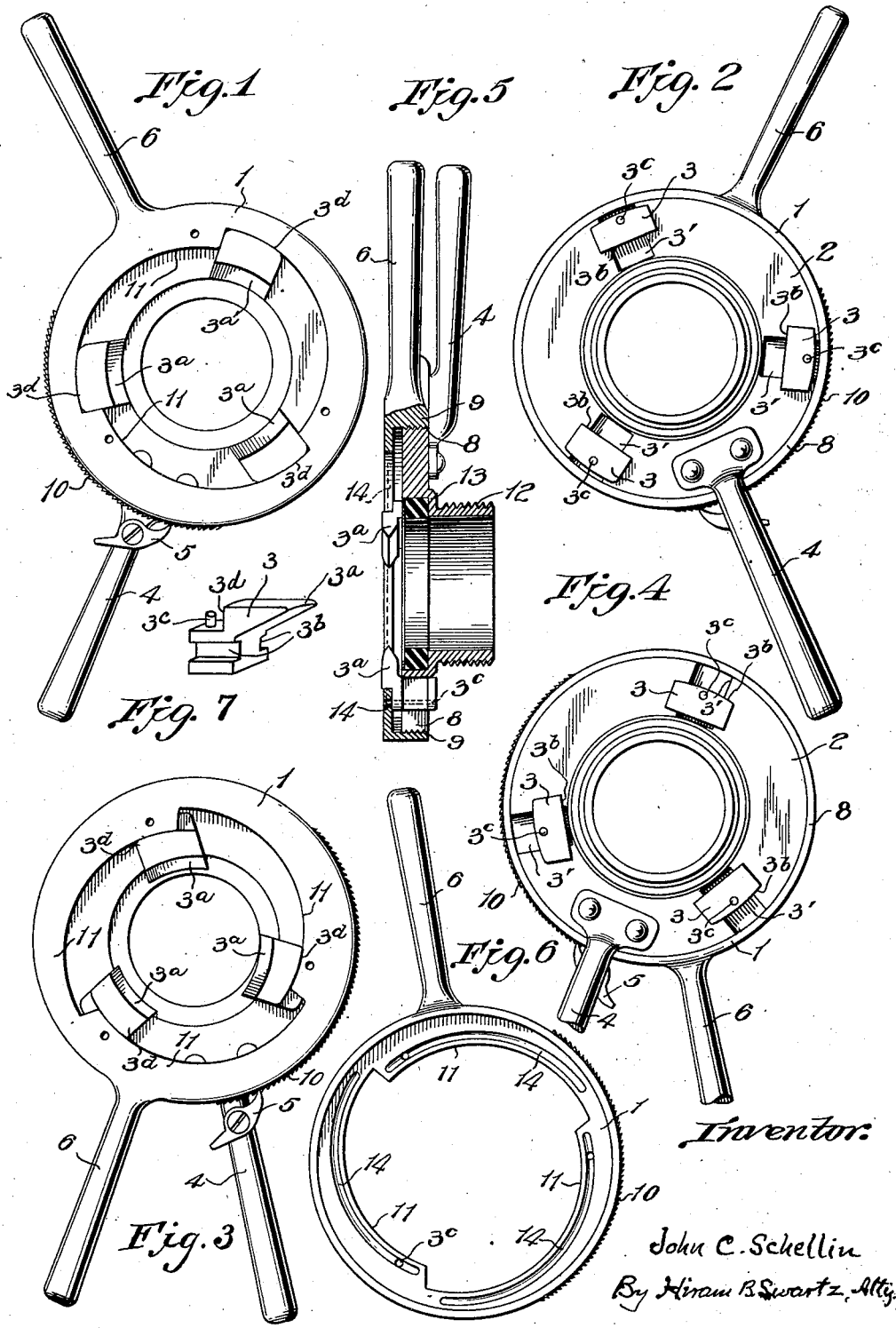

Patented June 3, 1930

1,761,157

UNITED STATES PATENT OFFICE

JOHN C. SCHELLIN, OF WOOSTER, OHIO

HOSE-COUPLING ADAPTER

Application filed January 28, 1928. Serial No. 250,281.

My invention relates to improvements in hose couplings, and particularly to such as are used for coupling hose lines with hydrants and the like, the principal object of which is to provide improved means for adapting the ordinary female threaded hose line coupling to engage with any ordinary male threaded hydrant plug, or the like, without difficulty, regardless of the diameter or number of threads per inch on the plug to which the hose line is to be attached. Another object is to provide improved means for engaging said plug in water tight connection with the hose line, and for instantaneously disengaging the same without unscrewing the threaded together members of the coupling. Other incidental objects will appear in the description. I attain said objects by the mechanism illustrated in the accompanying drawings in which Fig. 1 is a side view in perspective of one side of my universal hose-coupling adapter—so called—showing the means employed for engaging the male threaded plug on a hydrant, on the like, such as are in common use, and require no further description. Fig. 2 is a similar view of the obverse side of my coupling adapter, showing the means for engaging the female threads of a hose line coupling. Fig. 3 is a side view, similar to Fig. 1, showing the jaw-blocks drawn inwardly by the handles 4 and 6, and locked by the ratchet 5, 10. Fig. 4 is an obverse view of Fig. 3, showing the threaded plug to engage the female coupling member of a hose, and the inwardly drawn jaw-blocks. Fig. 5 is a cross sectional view of Fig. 3, showing the circular plates threaded together, the threaded male plug thereon, the gasket seated therein and the jaw-blocks in position. Fig. 6 is a plan view of the cam-plate showing the cam-grooves in the interior, paralleling the several cam notches, and Fig. 7 is a detail perspective view of one of the series of jaw-blocks, detached.

Similar numerals and letters of reference indicate like parts thruout the several views.

The circular plate 2 is revolubly mounted within the cam-plate 1 by means of its threaded peripheral face 8, which is adapted to mesh with a spiral female thread 9 within the peripheral rim of the cam-plate, as shown in Fig. 2. A handle projects from each plate to rotate the same, and a pawl 5 on plate 2, is adapted to engage the ratchet 10 on the periphery of plate 1 to lock the rotary movement of the pair of plates upon each other when the jaw blocks 3 are in gripping position. A series of slots, 3', are cut in a radial direction a limited distance into the edge of plate 2, as shown in Figs. 2 and 4, and a jaw block 3, (Fig. 5,) is fitted to slidingly reciprocate in each slot and is guided therein by the grooves $3^b$ which engage the side margins of the several slots respectively. Said jaw-blocks terminate inwardly with a single broad tooth $3^a$, which is spirally inclined to engage one of the helical threads of a male section, and the several teeth of the series are also arranged in spiral formation with respect to each other, so as to follow one another in the valley of the contiguous male thread of the coupling; and each block has an upstanding shoulder $3^d$.

A like series of cam-notches 11 in plate 1 are adapted to engage the adjacent shoulders $3^d$ on the jaw-blocks respectively, as shown in Fig. 1, whereby, when the plates 1 and 2 are united, and plate 1,—called the cam plate—is rotated upon plate 2 in one direction, the several jaw-blocks are simultaneously drawn toward each other in a radial direction by the action of said cams against said shoulders, respectively. Said cam-plate 1 is further provided with a like series of internal cam-grooves 14 paralleling said notches, respectively; and a pin or lug $3^c$, which projects from each jaw-block, as shown in Fig. 5, is fitted to slidingly engage its corresponding cam-groove, whereby, when said plate 1 is rotated in the opposite direction, the several jaw-blocks are automatically drawn apart simultaneously. A resilient gasket 13 is seated in plate 2 around the orifice leading thru the male threaded hose coupling 12, which engages the female section of the hose line, and when the several jaw-teeth $3^a$ are drawn into the valley of the male thread of a hydrant plug or coupling, the latter may, by a slight rotation of both plates in unison, be drawn into water tight connection, or, by disconnecting said pawl and ratchet, said cam plate may be freely rotated on plate 2, thereby disconnecting the coupling from the threaded male plug without unscrewing the same therefrom.

By the means aforesaid a universal hose coupling adapter is provided which makes it possible for the hose lines of one municipality to give assistance to another in case of fire, since its hose lines may be used at any point in another system, or different makes of hose line may be coupled together, regardless of thread variations in the hose couplings in use.

I am aware it is not new to employ a pair of rotatable plates to move jaw-blocks slidingly mounted in radial slots in one plate by means of inclined flanges on the other plate, and such combination I do not broadly claim.

Having thus fully described my invention, what I claim is—

1. A hose coupling adapter, comprising in combination, a pair of circular plates one rotatable upon the other, a series of cam notches in the outer plate, a like series of radial slots in the inner plate, and a like series of jaw-blocks slidable reciprocally in said slots, respectively, each block terminating inwardly with a tooth set spirally thereon, and the several teeth of the series arranged in spiral formation adapted to engage a helical thread on a male plug or coupling, an upstanding shoulder on each block adapted to reciprocate slidingly in the adjacent cam notch when the outer plate is rotated in one direction, and means, including a ratchet on the periphery of the outer plate for locking said plate when said jaw block teeth are in the valley of said helical thread, and for manually unlocking the same, and instantaneously disconnecting the coupling without unscrewing the threaded connection, substantially as set forth.

2. In a hose coupling adapter, the combination with a pair of plates, one rotatable on the other, a series of cam notches on the face of the outer plate, a like series of radial slots in the inner plate, and a like series of jaw-blocks slidable reciprocally in said slots, respectively, each block terminating inwardly with a tooth set spirally thereon, and the several teeth of the series arranged in spiral formation adapted to engage a helical thread on a male plug or coupling, an upstanding shoulder on each block adapted to reciprocate slidingly in the adjacent cam notch, a series of internal cam grooves within the outer plate paralleling the several cam notches therein, respectively, a pin lug projecting from each jaw-block into the adjacent internal cam groove adapted to slidingly reciprocate therein, and means, including a ratchet on the outer plate and a pawl on the inner plate to manually lock the outer plate when the jaw-block-teeth are in the valley of said helical thread, and unlock said plate and disconnect the coupling instantaneously without unscrewing the latter, substantially as set forth.

In witness whereof, I hereunto set my hand this 9th day of September, A. D. 1927.

JOHN C. SCHELLIN.